April 8, 1941.    G. C. WILHIDE    2,237,646
ELECTRIC TOOL
Filed March 10, 1939    3 Sheets-Sheet 2
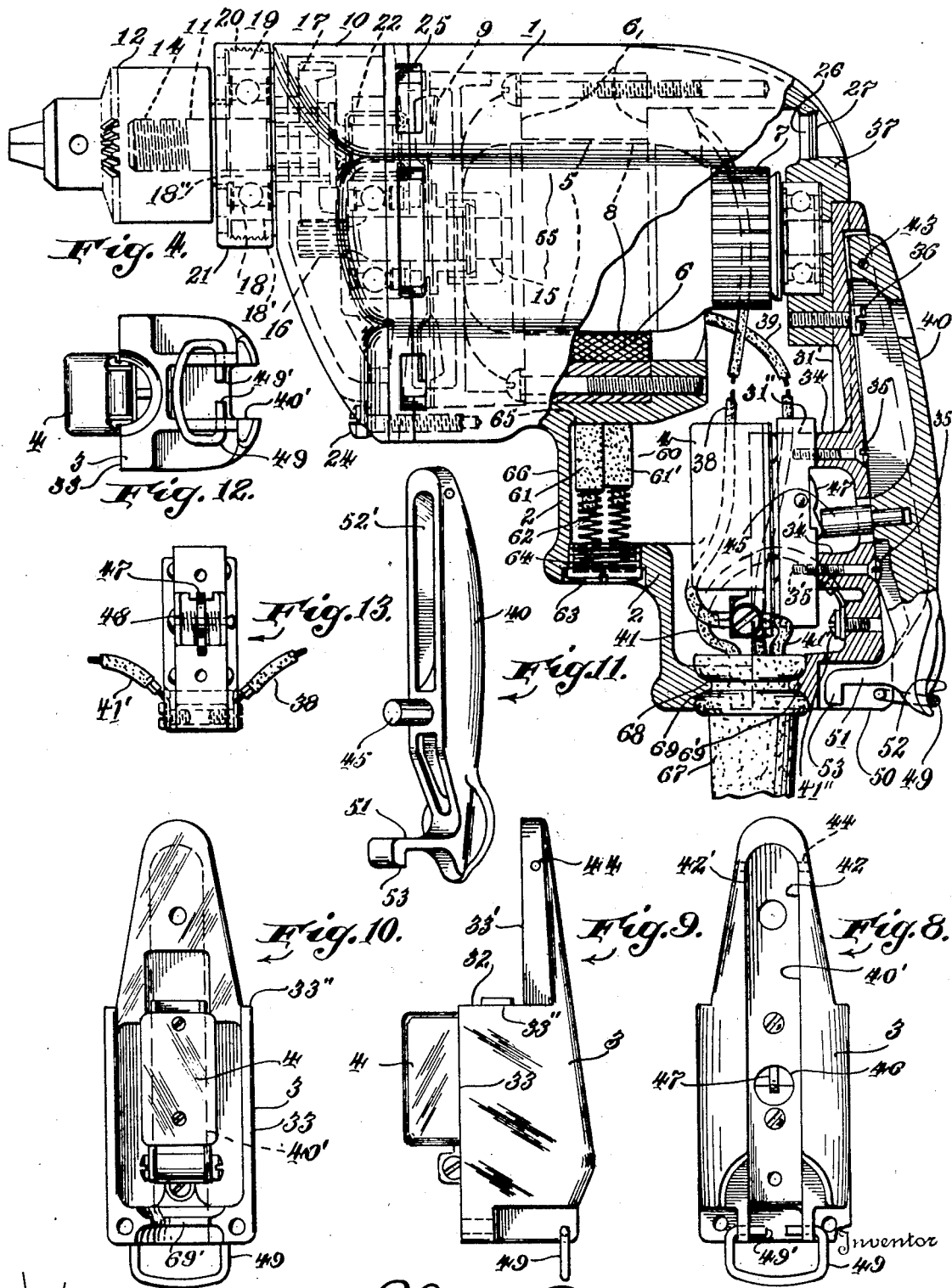

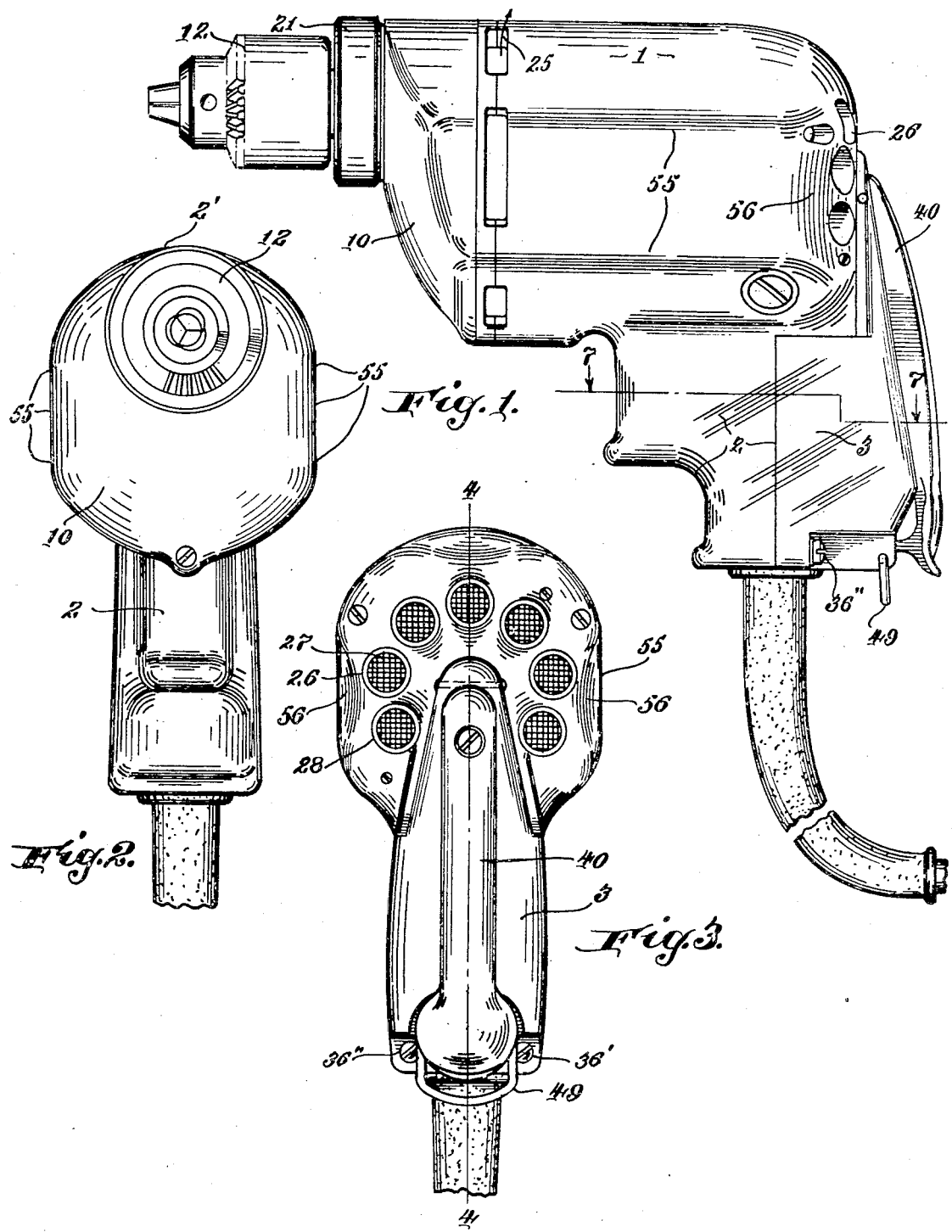

April 8, 1941.　　　　G. C. WILHIDE　　　　2,237,646
ELECTRIC TOOL
Filed March 10, 1939　　　　3 Sheets-Sheet 3
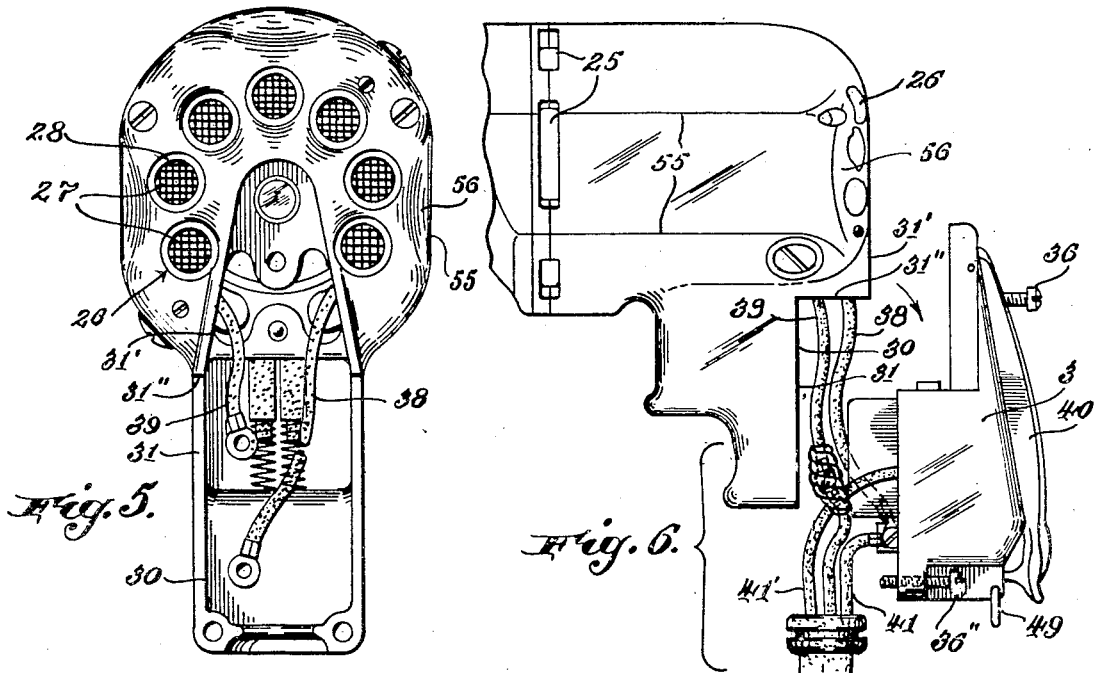
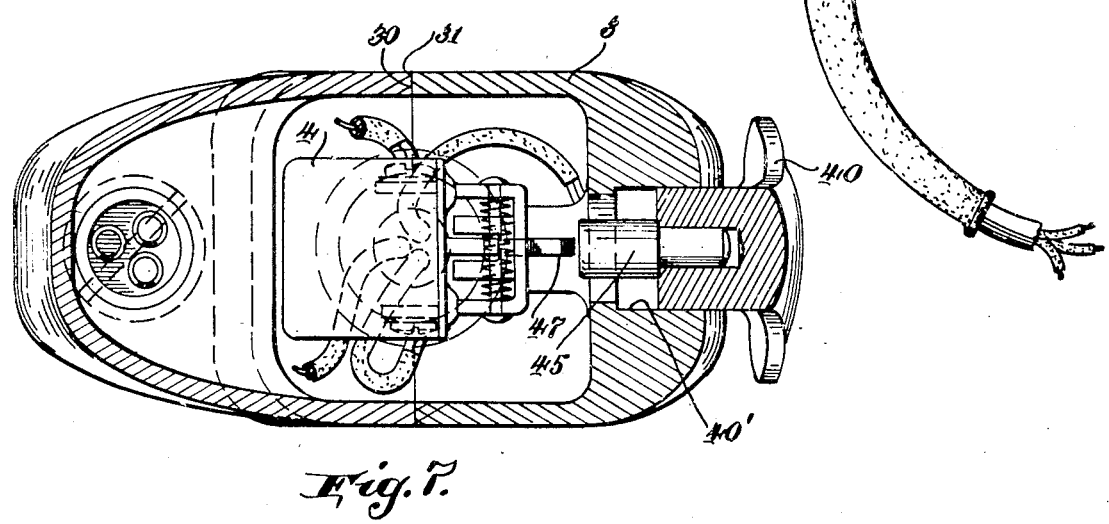

Patented Apr. 8, 1941

2,237,646

UNITED STATES PATENT OFFICE 2,237,646

ELECTRIC TOOL

Glenn C. Wilhide, Towson, Md., assignor to The Black & Decker Manufacturing Company, a corporation of Maryland Application March 10, 1939, Serial No. 260,935

16 Claims. (Cl. 172—36)

The invention relates to a portable electrically driven tool which is primarily of the rotary type adapted for use as a drill or as a tapper, or with suitable attachment as a screw driver or wrench. This tool like other tools of this general class is for assembly work for airplanes, automobiles and other mechanical devices and for general purposes as automobile and other repair and adjustment service and for general use by mechanics.

The tool which is the subject of the invention, in addition to its uses as a plain drill, is also adapted for use with various attachments as for angle drilling, and for driving a flexible shaft and for use with attachments to do the work of other tool heads of the rotary or reciprocating type.

The term "portable electrically driven tool" above is used in the sense that the tool is a power driven hand tool, i. e., hand controlled and directed, and the tool of the invention is of increased efficiency as compared to other tools on the market in that it is adapted for direction and control by one hand of the operator being more efficiently directed and controlled in this way than any of the earlier tools of the rectilinear type being easily grasped in the hand by means of the grip and directed by the thumb and fingers the tool being so shaped, as more fully hereinafter described, that the thumb and fingers respectively may extend along the side of the casing almost in line with the bit, giving a maximum of efficiency in the matter of direction and control by the one hand.

The one hand control is of particular importance in assembly work on airplanes, automobiles and the like in that there are numerous instances in which holes must be drilled or screws or nuts tightened in confined spaces which can only be conveniently reached by one hand of the operator, the other hand being most efficiently utilized in retaining the operator's working position. While assembly work represents the greatest demand, this tool has a broad application as a tool of general utility.

As contributing to the convenience of the one hand control and direction, it is of importance that the switch is located in the grip and is operated by a grip trigger which is at the rear of the tool thus leaving the front of the grip free for engagement by the finger in directing the tool. It is also an important advantage that the switch is operated by merely emphasizing or increasing the grip of the hand whereby the lower end of the trigger is pressed inwardly operating the switch.

An additional advantage of this arrangement over the earlier tools is that it makes the front portion of the hollow grip where the trigger has been located available as a compartment in which spare brushes may be stored so that suitable spare brushes may be kept with the tool at all times.

It is also of advantage that the switch as located in this tool is enclosed in a compartment the cover of which is at the rear and acts as a base or support for the trigger lever. The switch housing is attached to the opposite side of the cover, being conveniently removable with the cover with the electrical connections combined therewith so that the connections are easily made and inspected and replaced and repaired.

It is also of interest that the trigger lever is engaged by a swinging loop or shackle at the lower end which shackle can be operated by one finger of the hand which supports and controls the tool whereby the trigger and hence the switch are locked in the engaged position of the switch. This shackle may be released by a slight increase of the gripping pressure.

In the accompanying drawings I have illustrated a portable electric tool embodying the features of my invention in the preferred form.

In the drawings:

Fig. 1 is a side elevation of the tool fully assembled.

Fig. 2 is a front elevation of the same.

Fig. 3 is a rear elevation.

Fig. 4 is a side elevation, on enlarged scale, the grip portion and a part of the field casing being broken away and illustrated in section on the lines 4—4 in Fig. 3 which is the line of the axis, the rotor, however, being shown in elevation, likewise the switch casing or housing.

Fig. 5 is a rear elevation with the switch cover and trigger carrier thereby removed.

Fig. 6 is a fragmentary elevation showing the switch cover and the trigger lever partly removed and spaced away from the remainder of the tool, the connections being shown as they appear when these parts are thus located.

Fig. 7 is a sectional plan looking downwardly from the line 7—7 in Fig. 1.

Fig. 8 is a rear elevation of the switch and switch cover removed, the trigger lever or trigger being likewise removed from the cover, the switch and switch casing being attached and partially exposed through the hole which in operation is occupied by the actuating pin likewise removed.

Fig. 9 is an elevation of the same looking from the left in Fig. 8.

Fig. 10 is an elevation of the same looking from the front, i. e., from the left in Fig. 9, at the inside of the cover with the switch attached.

Fig. 11 is a perspective view of the trigger or trigger lever removed.

Fig. 12 is a plan bottom view of the parts shown in Figs. 8, 9 and 10.

Fig. 13 is an elevation of the switch housing or casing removed, the view being taken from the rear, i. e., from the right in Fig. 4.

Referring to the drawings by numerals, each of which is used to indicate the same or similar parts in the different figures, the construction shown comprises:

A field casing 1 of which the grip 2 in the form of the invention shown is an integral part, and cover 3 which may be regarded as part of the grip being removable. The switch assembly 4 is located in a compartment which is partly in grip 2 and is closed by the cover 3. The motor 5 including the field 6, commutator 7, and the rotor 8, is located in the field casing. Forwardly of the motor and also in the field casing there is a fan for cooling the motor to be further described. The gear casing 10 is attached to and covers the forward end of the field casing and contains gearing to be further described whereby the spindle 11 is driven at suitable speed, a chuck 12 being shown as attached to the spindle in a suitable manner as by means of the thread 14.

In the form of the invention shown the motor shaft 15 or rotor shaft as it may be called, is provided at its forward end with a pinion 16 which meshes with the gear 17 on the spindle.

In the form of the invention shown, the forward spindle bearing 18 is mounted in a hollow neck 19 which is concentric with the spindle bearing and shown as externally threaded at 20. This neck is closed at its outer end by a screw cap 21 which assists in holding the bearing races 18' 18" in position and by its removal provides for the mounting on the gear case of various attachments to be driven by the drill motor, as a flexible shaft, or an angle drilling attachment, or even a reciprocating tool head can be driven in this way, different tool heads being constructed to engage the thread 20. The gears are removable with the case 10.

The spindle 11 is mounted at its rear end in a needle bearing 22 by which it is maintained in proper alignment, this bearing is preferably mounted in the rear wall of the gear casing 10. The gear casing 10 is attached to the field casing or housing 1 by means of screws 24.

The wall of the field casing adjacent to its forward end is provided with circumferentially spaced and arranged ventilating slots 25. The slots 25 cooperate with the ventilating openings 26 at the rear. These are protected by screens 27 which are mounted on frames 28, shown as circular and adapted to be driven into the openings 26. The screens are very effective in protecting the motor from dirt and as shown these openings are arranged substantially in a circle about the rear end of the commutator 7 making a draft over and around the commutator and brushes and through the field and between the field and the rotor, this draft being propelled by the fan normally in a forwardly direction and discharged at the openings 25. The direction of the draft may if desired be reversed, the important feature being that the discharge openings 25 and the intake openings 26 are arranged about the periphery of the casing at the opposite ends of the motor providing a uniform draft which penetrates all portions of the space between the rotor and the field and cools the air in these sections giving complete and satisfactory cooling.

The improved construction includes the arrangement of the parts within the grip and also the trigger lever and the switch and the arrangement thereof are of considerable importance as contributing to the compactness of the tool and its efficiency of operation and particularly to the ease with which it may be directed and controlled and supported in one hand of the operator, giving the maximum of accuracy of control in a one hand tool, having the bit axis disposed in the direction of the motor axis. This latter detail is of importance in that it approaches the result obtained with the right angle drive.

While the present tool has a greater overall length in the direction of the spindle, it approaches more nearly to the effect of the right angle spindle than has previously been regarded as possible with a tool arranged in this way, i. e., in a tool having the spindle disposed in the direction of the motor axis.

Referring now to the grip assembly and the parts carried thereby; the grip portion 2 of the tool is preferably integral with the field casing 1, and is shown as hollow and cut away at the rear providing an opening 30 as best shown in Figs. 5 and 6, the latter figure showing the off-set edge surfaces 31 31', connected by the horizontal surfaces 31".

This opening 30 is closed by a cover 3 shown in Figs. 8, 9, 10 and 12 as formed with edge surface 32 comprising offset surfaces 33 and 33', connected by a longitudinal surfaces 33" and corresponding to the surfaces 31 and 31' and 31" in Figs. 5 and 6, as just described.

The cover 3 which fits the opening 30 as already pointed out is of hollow construction as best illustrated in Fig. 7, and it contains the switch, or switch assembly 4 secured therein as best illustrated in Fig. 4, being secured to the bosses 34 and 34' by screws 35 and 35'.

The cover 3 is secured at the top by a screw 36 which is seated in the rear bearing housing 37 which is part of the field casing, i. e., integral therewith in accordance with the details illustrated which in many instances are not essential. The cover 3 is further secured by screws 36' and 36" at the bottom seated in grip 2.

It is of interest that the mounting of the switch assembly on the inside of cover 3, and the trigger 40, to be described, on the outside of cover 3 provides by removal of cover 3 for full exposure of the parts inside of the hollow grip 2 and cover 3, including connections 38 and 39 to the brushes and the connection 41' from the switch to the outside, making the trigger, the switch, and the connections fully and completely accessible and easily removable for inspection, replacement, repair and the like. The connection or lead 39 extends directly into the cable 67 and the lead 41 is connected at 41" to the cover 3, or to any convenient point on the tool frame or casing. This third wire 41 extends through the cable the purpose being to ground the frame and/or casing. When the tool is used with a three wire system, including a ground wire 41 may be connected to the ground wire, or, when used with a two wire system, the wire 41 may be connected to any convenient ground, thus avoiding shock to the workman in case any part of the electrical system of the tool becomes shorted by contact with the frame or casing.

It is of interest that the trigger lever 40 is mounted in a seat or depression 40' in the removable switch cover 3, said seat or depression being best illustrated in Figs. 7 and 8. The seat or depression 40' provides guiding surfaces at the sides at 42 42', Fig. 8 for the trigger or switch lever. The latter is pivotally mounted by means of a transverse pivot pin 43 at the top which is seated in holes 44 which extend through the sides of the trigger seat or depression 40'.

The trigger or switch lever 40 is of the excess length as compared to the levers ordinarily provided for this purpose and extends substantially from the top of the cover 3 near the motor axis and slightly above the same to the bottom of the grip 2, the small lever 40 being located more particularly in the cover portion 3 and being throughout its length in the closed and open position guided by the sides 42 and 42' of the seat or depression 40'.

The trigger has secured thereto in a suitable manner as shown an actuating pin 45 which in the operative position of the trigger lever 40 is substantially parallel to the motor axis, this actuating pin 45 extends inside the cover 3 through an opening 46 in the cover, i. e., in the bottom of seat 40' as shown in Fig. 8, the pin 45 engaging the switch lever 47 illustrated in Figs. 4, 7 and 13.

The switch assembly which is of a known commercial type, the internal construction of which is believed unnecessary to illustrate, is provided with a torsion spring 48 which tends to maintain the switch open, the switch being closed at the will of the operator by pressure on the trigger lever 40 which advances the pin 45 pressing it against the lever 47, closing the switch against the tension of spring 48. The spring 48 serves to retract the switch lever 47 and trigger lever 40 when the latter is released and opens the switch. The cover 3 is provided at its lower end with a shackle or loop 49 which is mounted in spaced depending flanges or ears 50 on each side of a forwardly disposed end 51 of the trigger. This loop or shackle 49 may be swung by the little finger over the end of the trigger when it is desired to hold the switch or lock it in closed position whereby the tool remains in continued operation until released. The release is accomplished by further pressure on the trigger, the lock or shackle 49 being dropped and released by gravity when the trigger lever is fully depressed. The lower end of the lever is shown as concave at 52 to provide for the engagement of the shackle therewith. The forward end of the portion 51 has a depending stop 53 by the engagement of which with the ends 49' of the shackle 49 undesired retraction of the trigger beyond the depression 40' is prevented.

The trigger lever 40 is shown from the front in perspective in Fig. 11 which discloses the fact that the front of this lever which is disposed towards the cover 3 is hollow at 52' to give the desired lightness, the construction described being fully illustrated in this figure.

The form and arrangement of the member 2 in its relation to the field casing and the entire casing of the body and tool as shown in Fig. 1 is of great advantage, in that it provides a forward location of the grip and a cheap and simple mounting for the same, with a more satisfactory support of the tool in the hand near the center of gravity bringing the palm of the operator's hand near the line of the tool axis.

It is also of interest that the placing of the trigger 40 at the rear of the grip makes it possible to provide at the forward side of the grip in the place previously occupied by the trigger a chamber 60, and which is utilized to great advantage for the storage or retention of a pair of extra brushes suitable to the tool motor. The chamber or recess is indicated by reference character 60 and the stored brushes by reference characters 61 and 61'. The switch assembly, casing 4, closes this recess at the rear inside the handle chamber so that the brushes cannot get into the working parts and they are further held by the brush springs 62 which are attached to the brushes and are compressed by a screw plug 63, which is inserted into an opening 64 through which these spare brushes and springs are introduced and removed. The brushes 61 and 61' at their ends opposite to the springs bear against the top wall 65 of the recess or chamber 60, in which they are stored, the fact that the springs are under compression when the cap 63 is in place serves to hold the brushes and prevent their accidental dislodgement.

The forward wall 66 of the chamber or recess 60 serves as a grip for the middle finger in supporting and directing the tool.

The rubber cord protector 67 which contains the ends of the wires 41 outside the tool is peripherally grooved at its upper end at 68 and is clamped at this groove between the lower end of the cover 3 which is correspondingly shaped at 69' as to half of the periphery of the protector and a curve edge of the grip at 69. As the cover is drawn tight by means of screws 36' and 36", the gripping action effects the holding of the protector in place against removal or accidental displacement.

Fig. 1 shows the tool as of its actual size. In this connection, it is to be noted that the sides 55 in Figs. 1, 3 and 6 are flattened and the casing is grooved at and near the ends of these flat sides at 56 or made concave at these points so that the thumb and fingers are easily advanced over the surfaces 55. The thumb and finger or fingers located in this way assist in a very effective way in guiding and directing the tool and the bit being secured in chuck 12, the fingers and the thumb thus located are in substantial parallelism with the bit and closely adjacent thereto, and the palm is almost directly back of it giving exceedingly accurate and convenient control.

The extreme length of the grip in proportion to the field casing is also of importance, in that the long middle finger extending along the surface 55 and the fourth and little fingers enclosing the grip 2 contribute to the ease and accuracy of control.

Other important features of the invention are the compact arrangement of the tool given in proportion to the power, a tool of extremely short overall length, also the shape and arrangement of the casing and the grip 2 and cover 3 which make the tool easy to hold and operate with one hand giving at the same time a high degree of accuracy of direction are of great advantage.

A further important feature of the invention is the arrangement of the trigger lever or switch 40 and the switch assembly 4 in connection with the grip 3, whereby the switch assembly is mounted on the cover 3 on the inside of the grip and the trigger lever 40 is mounted on the cover outside of the same both the switch and trigger being removable with the grip cover. The palm operated trigger in substantial alignment with the bit gives extremely convenient control, accurate direction and efficient application of pressure in the direction of drilling.

It is also of importance that the trigger being at the rear, the space or chamber 60 is conveniently provided at the front of the grip 2 and within the same for the storage of the spare brushes 61, 61' with the springs 62 assembled therewith, the latter being to advantage utilized to hold the stored brushes in position whereby they are conveniently removed through the opening 64 controlled by the plug 63 which compresses the springs 62 when it is inserted.

The feature of ventilation of the motor and other parts by way of the rear openings 26 screened as described to protect the motor and other parts from large particles of dirt particularly from grit and the slots 25 at the front is of interest. Preferably the air is introduced at 26 and discharged by way of slots 25 but the current may if desired be reversed by changing the inclination of the blades of the fan.

It is also of importance that the forward end of the tool is so designed that the screw cap 21 which covers the spindle bearing 18, holding the ball races in position may be removed providing for the convenient connection to the tool and the support thereon of various attachments as already outlined.

I have thus described specifically and in detail a portable electric tool embodying the features of my invention in the preferred form in order that the manner of construction, applying, operating and using the invention may be fully understood. The improvements herein described are capable of use in various combinations and considerable variation from the structure shown is contemplated. The specific terms herein are used descriptively rather than in a limiting sense and the scope of the invention is defined in the claims.

What I claim as new and desire to secure by Letters Patent is:

1. In a portable electric tool having a field casing, a motor therein, having a rotor and a field, the casing being flattened at the sides to conform closely to the motor providing upright sides of said casing spaced by a relatively short horizontal transverse dimension and a grip extending downwardly and rearwardly from the longitudinal center of the field casing and elongated in a fore and aft direction, the tool being adapted to be directed and supported by one hand of the operator, the upright side surfaces of the field casing being adapted for engagement by the thumb and forward fingers and the grip being adapted to be held between the remaining fingers and the palm of the hand which supports and directs the tool, a switch controlling the motor and a lever for operating the switch, the lever being located at the rear of the grip to be engaged by the palm of said hand and extending from adjacent the motor axis down the grip.

2. A portable electric tool having a field casing, a motor comprising a stationary field and a rotor, and the casing being in close conformance with the transverse horizontal dimension of the motor and having flat normally upright surfaces at the sides of the casing spaced by a relatively short dimension, a pistol grip extending downwardly from the field casing near the longitudinal center of the same and elongated in a fore and aft direction the flat side surfaces of the casing being adapted for engagement by the thumb and forward fingers of the operator's hand, the grip being adapted for engagement between the remaining fingers and the palm of the same hand and a switch with a trigger lever extending down the rear side of said grip.

3. In a manually supported and directed electric tool, a motor, a casing therefor, a chambered grip, a switch in said grip controlling the motor, said chamber having an opening at the rear a cover closing the opening in said grip and a trigger lever mounted on said cover, the lever being at the rear on the outside of the cover and extending from the top of the grip downwardly to a point substantially adjacent the lower end of said grip.

4. A portable electric tool having a motor and motor shaft bearings, a field casing enclosing the motor, a pistol grip depending from the field casing, a switch controlling said motor, the switch in said grip, a trigger lever controlling the switch and located on the outside of the grip at the rear.

5. A portable electric tool having a motor and motor shaft bearings, a field casing enclosing the motor, a pistol grip depending from the field casing, a switch controlling said motor, the grip being hollow providing a chamber having a rear opening and containing said switch, a cover at the rear of the grip closing said opening, the switch being mounted on the cover on the inside of the same, a trigger lever controlling the switch and mounted on the outside of the cover, the opening and the cover having upright offset mutually contacting surfaces connecting by longitudinally extending contacting surfaces, the lower portion of the cover being elongated forwardly and the switch being mounted in said elongated portion.

6. A portable electric tool having a motor, a field casing enclosing the motor, a pistol grip depending from the field casing, a switch controlling said motor, the grip being hollow providing a chamber containing said switch, a cover at the rear of the grip closing said chamber, the switch being mounted on one side of the cover, the trigger lever controlling the switch and mounted on the other side of the cover, the cover being removable and the electric connections for the switch being attached to the switch and being exposed by the removal of the cover.

7. In a portable electric tool having a motor, a field casing for the motor, a pistol grip depending from the field casing and being hollow providing a chamber which is open at the rear, cover for said opening, a switch mounted on said cover and adapted to be enclosed in said chamber, and a lever for operating said switch mounted on the outside of the cover and an actuating pin extending through the cover.

8. In a portable electric tool having a motor, a field casing for the motor, a pistol grip depending from the field casing the grip being hollow providing a chamber a switch in the rear portion of said chamber and enclosed in said chamber, and a lever for operating said switch mounted on the outside of the grip and the grip having at the forward end of said chamber a space for the storage of spare motor brushes.

9. In a portable electric tool having a motor, a field casing for the motor, a pistol grip depending from the field casing the grip being hollow providing a chamber for a switch located in the rear portion of said chamber and enclosed in said chamber, and the grip having adjacent the forward end of said chamber a compartment adapted to the storage of spare motor parts attached to springs by which the said parts are held in position, a removable plug closing said storage space on which plug the said stored parts rest, the dimension of the chamber in line with said plug being slightly shorter than a spring and one of said parts combined whereby the parts are held by the tension of said springs when the plug is inserted and may be removed or inserted when the plug is removed.

10. An electric tool, having an electric motor, a casing for the motor and a grip depending from the said casing, a switch in said grip and a switch lever for operating the switch mounted on the rear of said grip and pivoted above the top of said grip and extending downwardly along said grip to a point near the bottom.

11. An electric tool, having an electric motor, a casing for the motor and a grip depending from the rear of said casing, a switch in said grip and a switch lever for operating the switch pivoted near the top of said grip extending downwardly along said grip to a point near the bottom, and locking means engaging the lower end of the lever for locking the switch in closed position.

12. An electric tool, having an electric motor a motor casing and a grip depending from the said casing, a switch in said grip and a switch lever for operating the switch pivoted at the top of said grip extending downwardly along said grip to a point near the bottom, and locking means engaging the lower end of the lever for locking the switch in closed position, the lever also having at its lower end a detent to prevent it from swinging free of the grip.

13. An electric tool having a motor, a motor casing a grip at the rear of the casing, and an elongated normally depending switch lever, a switch operated thereby, the lever extending from above the top of the bottom of the grip at the rear of the same and being adapted to be engaged by the palm of the hand holding the grip and operated by the pressure of the hand supporting the tool.

14. A portable electric tool comprising a field casing, a motor therein, the casing having normally upright flat surfaces at the sides and a pistol grip extending downwardly from the field casing and elongated in a fore and aft direction, the tool being adapted to be directed and supported in one hand, the side surfaces of the casing being adapted for engagement by the thumb and forward fingers and the pistol grip being adapted for engagement between the remaining fingers and the palm of the same hand, a trigger lever at the rear of the grip pivoted near the top and normally depending and adapted to be engaged and operated by the palm of the said hand directing and operating the tool.

15. A portable electric tool comprising a field casing, a motor therein, the casing having normally upright flat surfaces at the sides and a pistol grip extending downwardly from the field casing and elongated in a fore and aft direction, the tool being adapted to be directed and supported in one hand, the side surfaces of the casing being adapted for engagement by the thumb and forward fingers and the pistol grip being adapted for engagement between the remaining fingers and the palm of the same hand, a trigger lever at the rear of the grip pivoted near the top and normally depending and adapted to be engaged and operated by the palm of the said hand directing and operating the tool, the grip being chambered and comprising a rear cover for said chamber on which the trigger lever is mounted and a switch for the motor mounted on said cover on the inside.

16. In a portable electric tool having a field casing and a motor therein, a pistol grip at the rear of the casing, the latter being shaped at the sides to provide seating surfaces for the thumb and fingers of the hand holding the grip, and also shaped to provide a seat for the palm near the rear end of the motor axis, and a trigger controlling an electric switch the trigger protruding from the rear of the casing and grip through said seat which is engaged by the palm of the hand holding the grip, the tool being provided with means for holding a bit to operate in substantial alignment with said palm seat.

GLENN C. WILHIDE.